Figure 1:
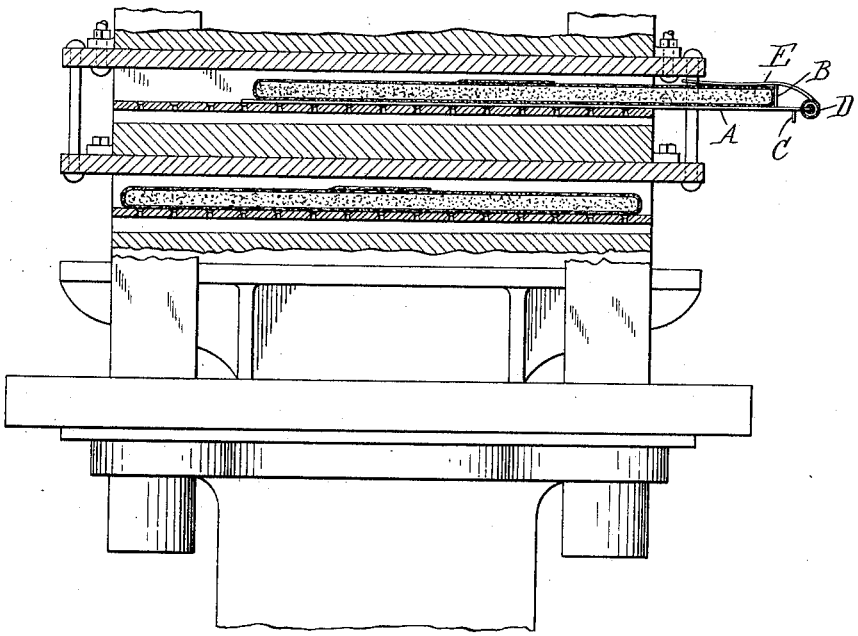

A. W. FRENCH.
OIL CAKE PAN.
APPLICATION FILED APR. 1, 1911.

1,029,435.

Patented June 11, 1912.

2 SHEETS—SHEET 1.

Witnesses.

Inventor.
Alfred W. French,
By Wilhelm, Parker & Hare,
Attorneys.

A. W. FRENCH.
OIL CAKE PAN.
APPLICATION FILED APR. 1, 1911.
1,029,435.
Patented June 11, 1912.
2 SHEETS—SHEET 2.
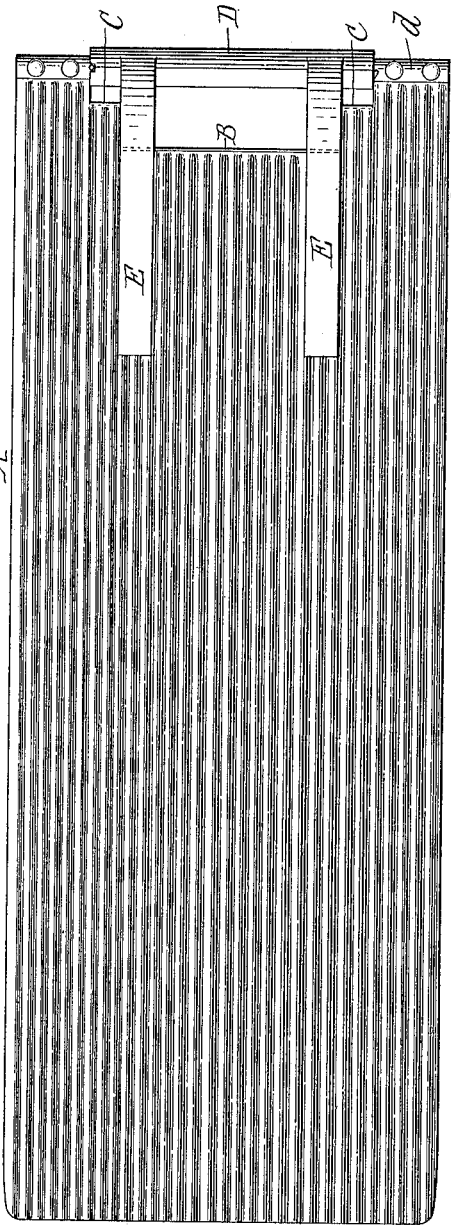
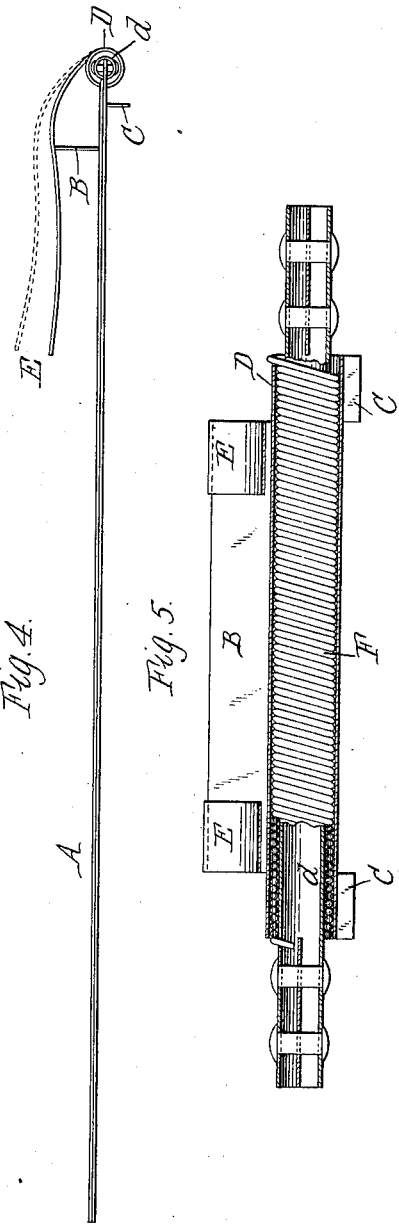

UNITED STATES PATENT OFFICE.

ALFRED W. FRENCH, OF PIQUA, OHIO.

OIL-CAKE PAN.

1,029,435.

Specification of Letters Patent.

Patented June 11, 1912.

Application filed April 1, 1911. Serial No. 618,356.

*To all whom it may concern:*

Be it known that I, ALFRED W. FRENCH, a citizen of the United States, residing at Piqua, in the county of Miami and State of Ohio, have invented a new and useful Improvement in Oil-Cake Pans, of which the following is a specification.

This invention relates to improvements in cake pans which are used in oil expressing mills for carrying the oil cakes from the cake former and inserting them into the boxes or spaces between the horizontal plates of the oil press. These cake pans, as generally made, consist simply of a flat rectangular piece of sheet steel with a handle at one end. They are usually made of about sixteen gage steel and weigh about ten to twelve pounds. The pan shover slips the pan under the molded cake in the cake former and shoves the pan with the cake thereon into the press box, or space between adjacent plates of the press, and withdraws the pan leaving the cake, which is wrapped in the press cloth, in the press. As the pan has a smooth surface the cake is apt to slide back on the pan when inserting it into the press box, if it fits closely in the box, and the pan shover has considerable difficulty at times in inserting the cakes. Furthermore, the pan shover has to work rapidly to remove the cakes from the cake former as fast as they are made, and in filling press boxes which are open at both the front and rear ends, he is liable to push some of the cakes into the boxes too far or not far enough, so that when the pressure is applied the cakes will project beyond the ends of the boxes, which leaves the cakes with soft end portions from which the oil is not fully expressed. The press cloth is simply wrapped once around the cake with its ends overlapping, as shown in the drawings, and in inserting the cakes into the press the cloth is frequently pulled back away from that end of the cake which is last to enter the press, which also results in this portion of the cake being left soft or not properly compressed.

The object of this invention is to produce a practical and desirable cake pan which will enable the cakes to be rapidly placed in proper position in the press boxes without especial care on the part of the pan shover and which will prevent the cloths from being pulled back away from the ends of the cakes, thereby overcoming the above noted objections to the cake pans heretofore used; and also to provide a cake pan of simple and inexpensive construction which is much lighter than the old style pans, so as thereby to materially lessen the labor of the pan shover. These results are accomplished by providing the cake pan with a back stop which engages the cake and positively shoves it into the press box, and also with a stop which engages the press and limits the movement of the pan into the box, thereby serving as a gage to insure the correct positioning of the cake in the box. The pan is also provided with movable fingers for holding the press cloth firmly against the cake and preventing it from being rumpled or pulled away from the cake when inserting the cake into the press. Instead of making the pan of a plain-faced steel sheet stiff enough to retain its shape, it is preferably made of a corrugated thin sheet which is very much lighter and therefore greatly reduces the weight of the pan.

Figure 2:
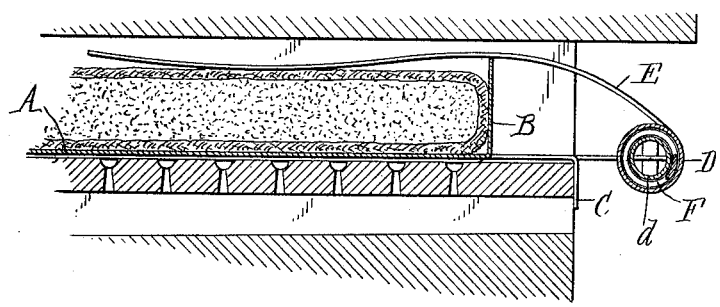

In the accompanying drawing, consisting of two sheets: Figure 1 is a fragmentary sectional elevation of an oil press illustrating the use of a cake pan embodying the invention. Fig. 2 is an enlarged fragmentary sectional elevation of the pan holding a cake. Fig. 3 is a reduced plan view of the pan. Fig. 4 is a side elevation thereof. Fig. 5 is an enlarged sectional elevation through the handle of the pan.

Like reference characters refer to like parts in the several figures.

The body, A, of the pan is of rectangular shape and of substantially the usual dimensions, but instead of being a plain-faced sheet of steel of the thickness necessary to prevent it from bending in use, it is preferably made of a thin light sheet of steel, or other suitable material, which is corrugated longitudinally, as shown in Fig. 3, to afford the necessary stiffness or rigidity.

Near the handle end thereof, the pan is provided with an upwardly projecting back stop or part B adapted to engage the adjacent end of the cake, and with stops or parts C which are adapted to strike the end of the rack, or other suitable part of the press, to limit the distance to which the pan can be shoved into the press. The stops C are so located relative to the back stop B that the cake will be located in the box equidistant from its opposite ends when the pan stops C engage the rack and arrest the inward movement of the pan. As shown in the drawings, the back stop B and the stops C are formed respectively by an upwardly bent and two downwardly bent integral portions of the pan body, the former being located between the latter. Manifestly, however, the pan could be provided with one or more upwardly projecting parts formed thereon or secured thereto in any suitable way for engaging the cake and with one or more stops formed thereon or secured thereto in any suitable way for engaging a suitable part of the press to properly limit the movement of the pan into the press.

D represents the handle of the pan which, as usual, is located at one end of the pan, and E E represent fingers or parts which extend forwardly from the handle over the pan so as to bear on the adjacent end portion of the cloth-covered cake. The handle is mounted to rock or turn for raising the fingers to enable the pan to be shoved under the cake in the cake former, and is actuated by a spring F which presses the fingers against the wrapped cake so that the cake is grasped firmly between the fingers and the body of the pan.

The handle preferably consists of a tube loosely surrounding a rod or tube $d$ which extends across the end of the pan body and is riveted or otherwise rigidly secured at its ends to the opposite side portions of the pan body. The spring F surrounds the rod or tube $d$ inside of the handle and is attached in any suitable manner at one end to the handle and at the other end to the rod or tube $d$ so that it acts to turn the handle and press the fingers E toward the body of the pan. The handle can be constructed and rotatably connected to the pan in any other suitable way and any other sort of operating spring for the holding fingers can be used.

In using this cake pan, the pan shover slips the pan under the cloth-covered cake in the cake former box at the same time turning the handle D by a twisting motion of his wrist so as to allow the cake to enter beneath the fingers E. When the cake is in position on the pan with its end against the back stop B, he releases the handle sufficiently for the spring F to press the fingers E firmly down on the wrapped cake. The pan is then withdrawn with the cake from the former and shoved into the box or space between plates of the press until the pan is arrested by its stops C striking the press rack, which, as explained, properly locates the cake in the press. The handle can then be turned again to raise the fingers E to release the cake, though this is not ordinarily necessary, and the pan is withdrawn, leaving the cake in the press.

The spring fingers E and the back stop B hold the press cloth firmly against the end of the cake and effectually prevent the cloth from being rumpled or pulled away from the cake by frictional contact with the press box or plate when inserting the cake.

By corrugating the pan as explained, a very much lighter sheet steel can be used which greatly reduces the total weight of the pan. The importance of this will be realized when it is considered that the pan shover frequently carries the pan with its cake between the cake former and the press three thousand or more times in a day.

I claim as my invention:

1. A cake pan for inserting oil cakes into presses comprising a flat body which is provided at one end with a transverse handle, and is also provided with a stop projection adapted to strike a portion of the press to limit the movement of the pan into the press, substantially as set forth.

2. A cake pan for inserting oil cakes into presses which is provided with an upwardly projecting back stop adapted to engage one end of the cake, and with a stop projection adapted to strike a portion of the press to limit the movement of the pan into the press, substantially as set forth.

3. A cake pan for inserting oil cakes into presses which is provided near one end with an upwardly projecting back stop to engage one end of the cake, and with a downwardly projecting stop adapted to strike a portion of the press to limit the movement of the pan into the press, substantially as set forth.

4. A cake pan for inserting oil cakes into presses which is provided with an integral upwardly bent portion forming a back stop adapted to engage one end of the cake, and with an integral downwardly bent stop portion adapted to strike a part of the press to limit the movement of the pan into the press, substantially as set forth.

5. A cake pan for inserting cakes into presses consisting of a thin sheet of metal provided with longitudinal corrugations and provided at one end with a handle, substantially as set forth.

6. A cake pan for inserting oil cakes into presses comprising a body, a finger arranged at one end of the body and adapted to bear against the cloth covering the cake, and means for moving said finger so that the pan can be shoved beneath the cake, substantially as set forth.

7. A cake pan for inserting oil cakes into presses comprising a body, a finger arranged at one end of the body, a spring which presses said finger toward the pan body for holding the cloth covering the cake, and means for moving said finger in a direction away from the pan body, substantially as set forth.

8. A cake pan for inserting oil cakes into presses comprising a body, a rotatable handle at one end of the body provided with a finger which projects over the pan body, and a spring which presses said finger toward the pan body, said finger being moved in a direction away from the pan body by turning said handle, substantially as set forth.

9. A cake pan for inserting oil cakes into presses comprising a body, a rotatable handle at one end of the body provided with a finger which projects over the pan body, and a spring which is inclosed in said handle and acts on the handle to press said finger toward the pan body, said finger being moved in a direction away from the pan body by turning said handle, substantially as set forth.

10. A cake pan for inserting oil cakes into presses comprising a body provided near one end with an upwardly projecting back stop for the cake, a finger which is pressed toward the pan body, and a handle for the pan which is movable for moving said finger in a direction away from the pan body, substantially as set forth.

Witness my hand, this 29th day of March, 1911.

ALFRED W. FRENCH.

Witnesses:
C. B. JAMISON,
FLORENCE A. SPRAUL.

Copies of this patent may be obtained for five cents each, by addressing the "Commissioner of Patents, Washington, D. C."